United States Patent
Yamada et al.

(10) Patent No.: US 11,035,953 B2
(45) Date of Patent: Jun. 15, 2021

(54) RADAR APPARATUS

(71) Applicant: MITSUBISHI ELECTRIC CORPORATION, Tokyo (JP)

(72) Inventors: Tetsutaro Yamada, Tokyo (JP); Yasushi Obata, Tokyo (JP); Hiroshi Kameda, Tokyo (JP); Tomoyuki Koyanagi, Tokyo (JP); Taizo Isono, Tokyo (JP); Toshihiko Arioka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 288 days.

(21) Appl. No.: 16/323,606

(22) PCT Filed: Aug. 25, 2016

(86) PCT No.: PCT/JP2016/074823
§ 371 (c)(1),
(2) Date: Feb. 6, 2019

(87) PCT Pub. No.: WO2018/037533
PCT Pub. Date: Mar. 1, 2018

(65) Prior Publication Data
US 2019/0179011 A1    Jun. 13, 2019

(51) Int. Cl.
*G01S 13/95* (2006.01)
*H04W 4/90* (2018.01)
(Continued)

(52) U.S. Cl.
CPC .......... *G01S 13/951* (2013.01); *G01S 13/534* (2013.01); *G01S 13/58* (2013.01); *G01S 13/886* (2013.01);
(Continued)

(58) Field of Classification Search
None
See application file for complete search history.

(56) References Cited

U.S. PATENT DOCUMENTS

| 4,172,255 A * | 10/1979 | Barrick | G01S 13/89 342/26 D |
| 5,264,852 A * | 11/1993 | Marquet | G01S 13/955 342/26 A |
| 5,331,326 A * | 7/1994 | Schenkel | G01S 13/4418 342/148 |

(Continued)

FOREIGN PATENT DOCUMENTS

| JP | 2015-4608 A | 1/2015 |
| JP | 2015-4610 A | 1/2015 |

(Continued)

OTHER PUBLICATIONS

Lipa et al., "Tsunami Arrival Detection with High Frequency (HF) Radar", Remote Sensing, 2012, vol. 4, pp. 1448-1461.
(Continued)

*Primary Examiner* — Bernarr E Gregory
(74) *Attorney, Agent, or Firm* — Birch, Stewart, Kolasch & Birch, LLP.

(57) ABSTRACT

A detection area determining unit (6) determines a detection area where there is a possibility that a tsunami occurs. A current velocity estimating unit (7) estimates, as a sea-surface velocity of current in the detection area, a value obtained by smoothing sea-surface velocity of currents corresponding to cells included in the detection area. A tsunami detecting unit (8) detects occurrence of the tsunami in the detection area, based on the sea-surface velocity of current estimated by the current velocity estimating unit (7).

11 Claims, 10 Drawing Sheets

(51) Int. Cl.
  *G01S 13/534* (2006.01)
  *G01S 13/88* (2006.01)
  *G08B 21/10* (2006.01)
  *G01S 13/58* (2006.01)
  *G01S 13/00* (2006.01)

(52) U.S. Cl.
  CPC .............. *G01S 13/95* (2013.01); *G08B 21/10* (2013.01); *H04W 4/90* (2018.02); *Y02A 90/10* (2018.01)

(56) References Cited

U.S. PATENT DOCUMENTS

| | | | | |
|---|---|---|---|---|
| 5,469,168 | A * | 11/1995 | Anderson | G01S 13/951 342/26 D |
| 5,808,741 | A * | 9/1998 | Anderson | G01S 13/95 356/496 |
| 6,856,276 | B2 * | 2/2005 | Barrick | G01S 13/003 342/59 |
| 6,911,931 | B2 * | 6/2005 | Vincent | G01S 13/9023 342/25 C |
| 7,808,426 | B1 * | 10/2010 | Smith, Jr. | G01S 13/003 342/123 |
| 7,830,302 | B1 * | 11/2010 | Smith, Jr. | G01S 13/003 342/123 |
| 10,042,051 | B2 * | 8/2018 | Barrick | G01S 13/951 |
| 2003/0071751 | A1 * | 4/2003 | Barrick | G01S 13/89 342/104 |
| 2010/0007547 | A1 * | 1/2010 | D'Addio | G01S 13/003 342/120 |
| 2010/0073218 | A1 * | 3/2010 | Stockmann | G01S 13/5248 342/146 |

FOREIGN PATENT DOCUMENTS

| | | | | |
|---|---|---|---|---|
| WO | WO2014/192326 | A1 * | 4/2014 | G01S 13/95 |
| WO | WO2016/079848 | A1 * | 5/2016 | G01S 13/95 |

OTHER PUBLICATIONS

Office Action issued in corresponding Indonesian Patent Application No. PID201901464 dated Feb. 18, 2021 with an English Translation.

* cited by examiner

RADAR APPARATUS

TECHNICAL FIELD

The present disclosure relates to radar apparatuses for detecting detection target events, such as tsunamis.

BACKGROUND ART

In recent years, to reliably perform tsunami warning, it is expected to detect tsunamis with high accuracy by using a radar apparatus. In a radar apparatus, radio waves are radiated from the transmission unit to a sea surface, the radio waves reflected on the sea surface are received by the reception unit, and the received radio waves are analyzed, whereby a sea-surface current velocity is observed.

Note that an observation area of a radar is divided into a plurality of areas along the range direction and azimuth direction, and that each divided area is called a cell.

The sea-surface current velocity is observed for each cell, and an observation error is superimposed on each observed sea-surface current velocity due to influence of thermal noise of the reception unit or current velocity fluctuation caused by winds. If the observation error is large, the observed current velocity deviates from the actual current velocity, and a false alarm caused by erroneous detection of a tsunami often occurs, or there is a possibility that a tsunami occurred is missed.

To cope with this, for example, in a radar apparatus described in Non-Patent Literature 1, on the assumption that a tsunami propagates in a direction orthogonal to depth contours of submarine topography, sea-surface current velocities of respective cells adjacent along the same depth contour are added and averaged. That is, this radar apparatus regards that the wavefront of the tsunami is along the depth contour of the submarine topography, and suppresses variation in the current velocity due to the observation error.

CITATION LIST

Patent Literatures

Non-Patent Literature 1: B. Lipa, J. Isaacson, B. Nyden and D. Barrick, "Tsunami Arrival Detection with High Frequency (HF) Radar", Remote Sensing, Vol. 4, pp. 1448-1461, 2012.

SUMMARY OF INVENTION

Technical Problem

However, in the case in which the submarine topography is complicated or the source of a tsunami is close to the coast, the tsunami does not necessarily propagate in the direction orthogonal to depth contours of a submarine topography.

In this case, the radar apparatus described in Non-Patent Literature 1 cannot appropriately suppress variation in the current velocity observed, and cannot appropriately detect the tsunami that is a detection target event. For this reason, a false alarm caused by erroneous detection of the tsunami often occurs, or there is a possibility that a tsunami is not detected even when the tsunami occurs.

One or more embodiments of the present disclosure are intended to solve the above problems, and an object of the one or more embodiments is to provide a radar apparatus capable of detecting occurrence of a detection target event with high accuracy.

Solution to Problem

A radar apparatus according to embodiments of the present disclosure includes a velocity calculating unit, a bias correction unit, a detection area determining unit, a velocity estimating unit, and an event detecting unit. The velocity calculating unit calculates a velocity of an observation target corresponding to each of a plurality of cells formed by dividing an observation area in a range direction and an azimuth direction, based on reception signals of electromagnetic waves radiated toward the observation area and reflected by the observation target in the observation area. The bias correction unit performs correction to remove a periodic bias component from the velocity of the observation target at each cell calculated by the velocity calculating unit. The detection area determining unit determines a detection area at which there is a possibility that a detection target event occurs, based on one of relationships between a distance over the cells and a change in velocity of the observation target or between the distance over the cells, the change in velocity of the observation target, and a direction relation of velocity vectors of the observation target between the cells. The velocity estimating unit selects and smoothes velocities of the observation target corresponding to cells included in the detection area among the velocities of the observation target corrected by the bias correction unit, and estimating a velocity of the observation target at the detection area as a smoothed value. The event detecting unit detects an occurrence of the detection target event in the detection area, based on the velocity of the observation target that is estimated by the velocity estimating unit.

Advantageous Effects of Invention

According to embodiments of the present disclosure, a detection area is determined at which there is a possibility that a detection target event occurs, and a velocity of an observation target in the detection area is estimated as a value obtained by smoothing observation target velocities corresponding to cells included in the detection area. Then, based on the estimated velocity of the observation target, an occurrence of a detection target event in the detection area is detected. With this configuration, the occurrence of the detection target event can be detected with high accuracy.

DESCRIPTION OF EMBODIMENTS

Embodiment 1

Figure 1:
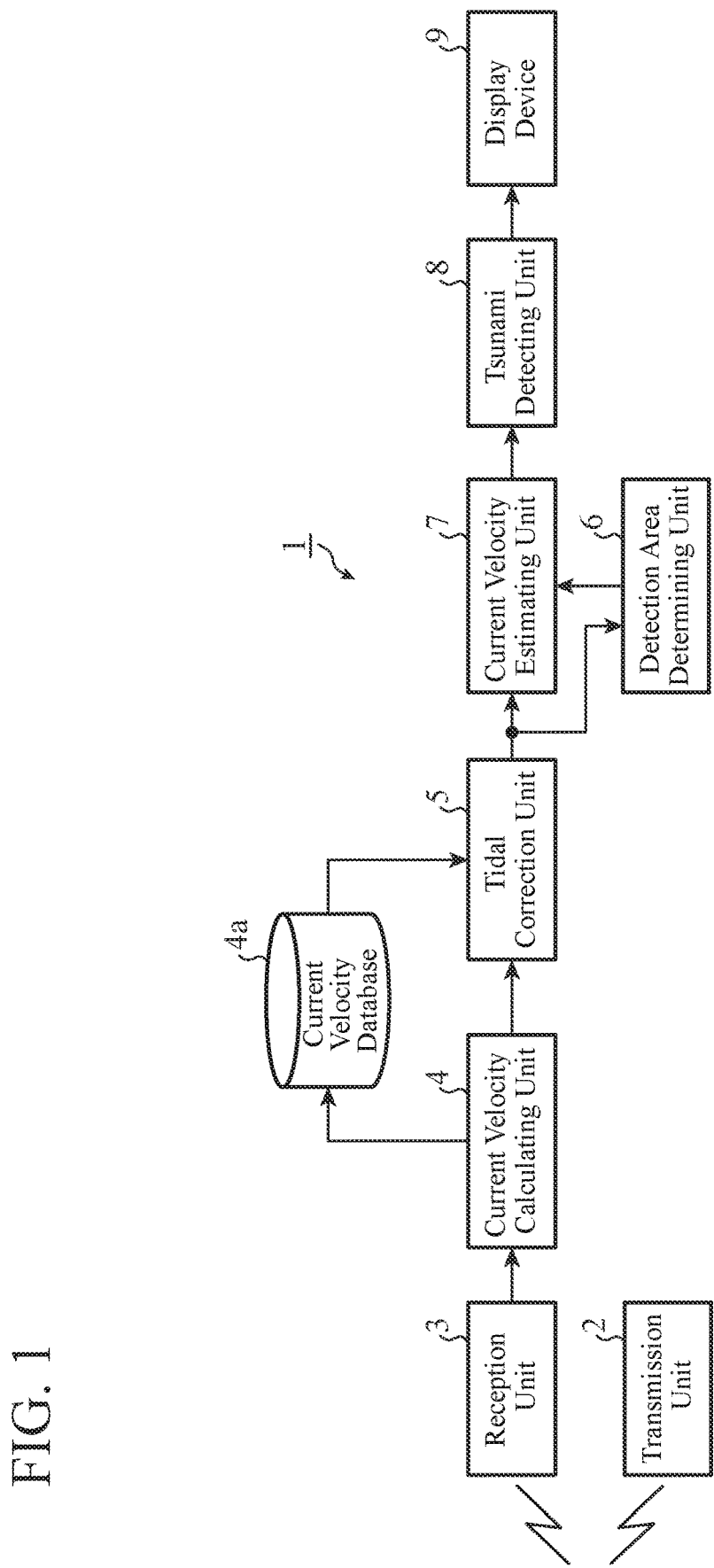
FIG. 1 is a block diagram illustrating a configuration of a radar apparatus according to Embodiment 1 of the present disclosure.

FIG. 1 is a block diagram illustrating a configuration of a radar apparatus 1 according to Embodiment 1 of the present disclosure, and illustrates a case in which the radar apparatus 1 is an ocean radar apparatus. Note that, the ocean radar apparatus is a radar apparatus for detecting a tsunami arriving toward the land, by transmitting electromagnetic waves to an observation area, and receiving and analyzing the electromagnetic waves reflected on a sea surface in the observation area.

In FIG. 1, a transmission unit 2 transmits the electromagnetic waves toward the observation area. There is no particular limitation on the type of the electromagnetic waves transmitted by the transmission unit 2. For example, electromagnetic waves in a short-wave band of about 3 MHz to 30 MHz, or electromagnetic waves in an ultrashort-wave band of about 30 MHz to 300 MHz can be used.

A reception unit 3 receives electromagnetic waves that are reflected by the sea surface in the observation area, among the electromagnetic waves transmitted by the transmission unit 2. Furthermore, the reception unit 3 performs amplification processing of reception signals of the electromagnetic waves, further performs signal processing such as frequency conversion processing, and performs A/D conversion on the reception signals after the signal processing. Digital signals obtained by the A/D conversion are output from the reception unit 3 to a current velocity calculating unit 4.

Note that, in FIG. 1, a case is illustrated in which the transmission unit 2 and the reception unit 3 are separate units, but this configuration is not a limitation. For example, the transmission unit 2 and the reception unit 3 may be integrated together, and a transmission/reception unit having both functions may be provided in the radar apparatus 1.

The current velocity calculating unit 4 calculates sea-surface current velocities each corresponding to each of a plurality of cells, based on the digital signal input from the reception unit 3.

Note that, the plurality of cells is formed by dividing the observation area in the range direction and the azimuth direction, and current velocities on the sea surface that is the observation target are calculated for the respective cells by the current velocity calculating unit 4.

A current velocity database 4a is a database for storing current velocity data calculated by the current velocity calculating unit 4, and is built on a storage area of a storage device such as random access memory (RAM) or a hard disk. The current velocity data stored in the current velocity database 4a can be read by a tidal correction unit 5.

Note that, the storage device in which the current velocity database 4a is built may be a storage device incorporated in the radar apparatus 1, or may be a storage device provided outside the radar apparatus 1. That is, the current velocity database 4a only needs to be built in a storage device in which the current velocity calculating unit 4 can store the data and from which the tidal correction unit 5 can read the data.

The tidal correction unit 5 is a component embodying the bias correction unit, and performs correction to remove a periodic bias component from each of the sea-surface current velocities of the respective cells calculated by the current velocity calculating unit 4. Here, the periodic bias component is a varying component of the current velocity due to long-periodic water level variation due to the tide. Hereinafter, this varying component is described as a tidal component.

For example, the tidal correction unit 5 extracts the tidal component added to each of the sea-surface current velocities of the respective cells due to influence of the long-term tide, based on the current velocities of the respective cells calculated by the current velocity calculating unit 4 and the current velocity data for the respective cells read from the current velocity database 4a. Subsequently, the tidal correction unit 5 performs correction to subtract the extracted tidal component from each of the sea-surface current velocities of the respective cells calculated by the current velocity calculating unit 4.

A detection area determining unit 6 is a component for determining, from the observation area, a detection area where there is a possibility that a tsunami that is a detection target event occurs. Here, the detection area is determined based on one of relationships between a distance over the cells and a change in velocity of the observation target or between the distance over the cells, the change in velocity of the observation target, and a direction relation of velocity vectors of the observation target between the cells.

For example, the detection area determining unit 6 selects, from cells whose distance to a cell at which a tsunami is assumed to have arrived is within a certain range, cells whose attenuation of a peak current velocity of the sea surface is less than or equal to a constant value, and determines an area including the selected cells as the detection area.

Alternatively, the detection area determining unit 6 may select, from cells whose distance to a cell at which a tsunami is assumed to have arrived is within a certain range, cells on the basis of the attenuation of the peak current velocity of the sea surface due to the distance between the cells, and the attenuation due to a difference between directions of sea-surface velocity vectors.

A current velocity estimating unit 7 is a component embodying the velocity estimating unit, and estimates the current velocity at the sea-surface of the detection area as the value that is obtained by smoothing sea-surface current velocities each corresponding to a cell included in the detection area.

For example, the current velocity estimating unit 7 selects sea-surface current velocities corresponding to the cells included in the detection area, among the sea-surface current velocities of the respective cells corrected by the tidal correction unit 5, and calculates the integral or average of the current velocities in a manner that depends on observation errors of the current velocity. A value thus smoothed is estimated as a current velocity of the entire sea surface in the detection area. As a result, the observation errors of the sea-surface current velocities are suppressed for each detection area determined by the detection area determining unit 6.

A tsunami detecting unit 8 is a component embodying the event detecting unit, and detects occurrence of the tsunami in the detection area, based on the sea-surface current velocity in the detection area estimated by the current velocity estimating unit 7.

For example, the tsunami detecting unit 8 compares the sea-surface current velocity in the detection area with a threshold value, and determines that the tsunami has occurred in the detection area if the sea-surface current velocity exceeds the threshold value, or determines that no tsunami has occurred if the sea-surface current velocity is less than or equal to the threshold value.

A display device 9 is a display device for displaying information on the tsunami detected by the tsunami detecting unit 8, and includes, for example, a graphics processing unit (GPU) and a liquid crystal display. In addition, the display device 9 may display, for example, a distribution of current-velocity vector at sea surface, detection information of tsunami, and a predicted arrival position of tsunami.

Figure 2A:
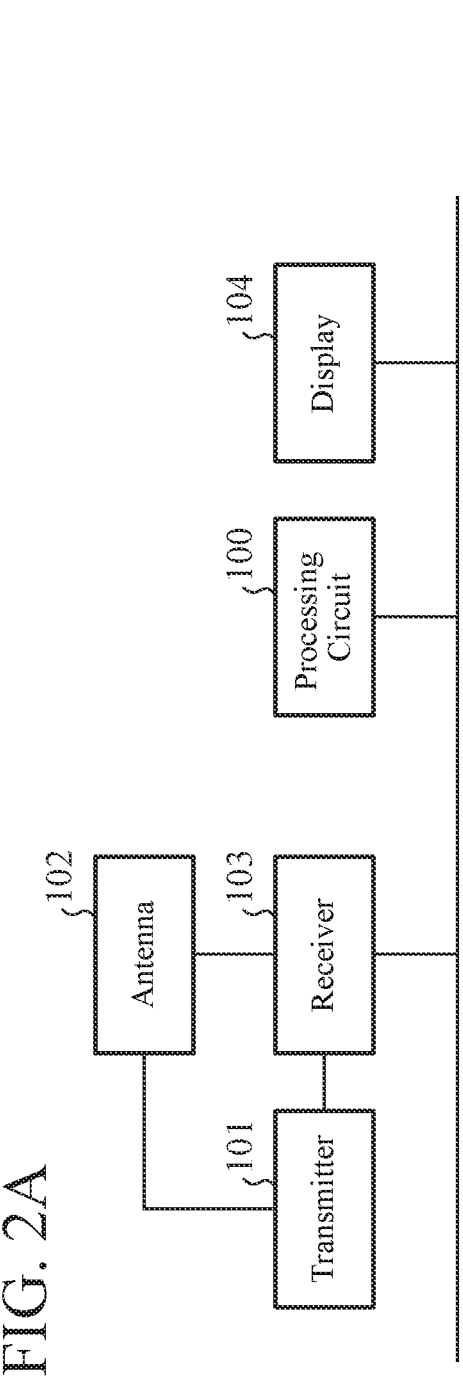
FIG. 2A is a block diagram illustrating a hardware configuration for implementing a function of the radar apparatus according to Embodiment 1.

FIG. 2A is a block diagram illustrating a hardware configuration for implementing the function of the radar apparatus 1.

Figure 2B:
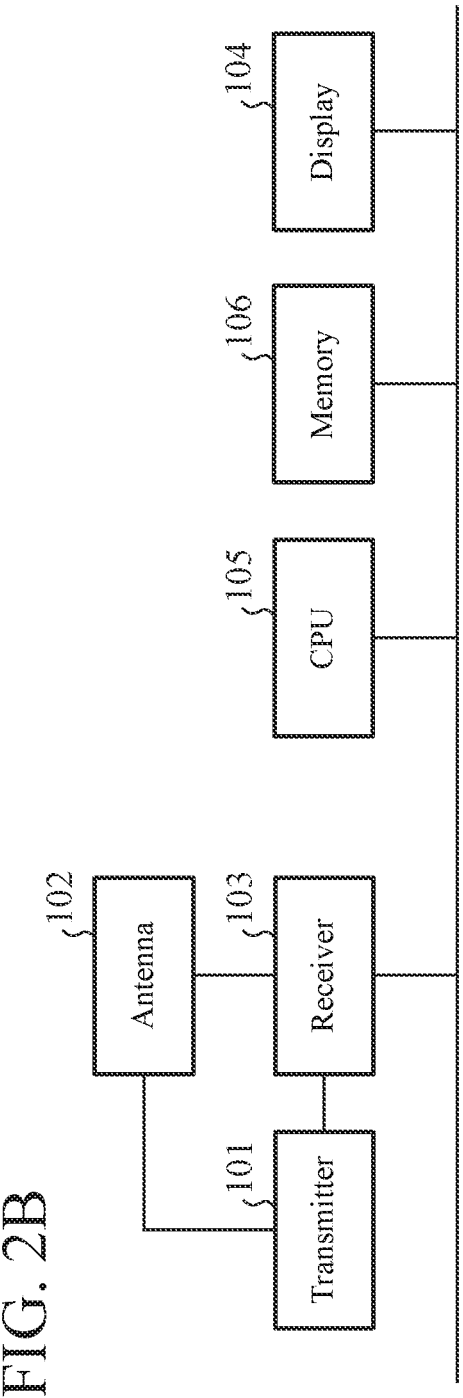
FIG. 2B is a block diagram illustrating a hardware configuration for executing software for implementing the function of the radar apparatus according to Embodiment 1.

FIG. 2B is a block diagram illustrating a hardware configuration for executing software for implementing the function of the radar apparatus 1. In FIGS. 2A and 2B, a transmitter 101 radiates electromagnetic waves via an antenna 102, and a receiver 103 receives electromagnetic waves via the antenna 102. The transmission unit 2 in the radar apparatus 1 is the transmitter 101 and the reception unit 3 is the receiver 103. In addition, the display device 9 is a display 104.

Functions of the current velocity calculating unit 4, the tidal correction unit 5, the detection area determining unit 6, the current velocity estimating unit 7, and the tsunami detecting unit 8 in the radar apparatus 1 are implemented by a processing circuit. That is, the radar apparatus 1 includes the processing circuit for executing operation of each of the functions.

The processing circuit may be dedicated hardware, or a central processing unit (CPU) for executing a program read from a memory.

As illustrated in FIG. 2A, when the processing circuit is the dedicated hardware, examples of a processing circuit 100 include a single circuit, a composite circuit, a programmed processor, a parallel-programmed processor, an application specific integrated circuit (ASIC), a field-programmable gate array (FPGA), or a combination thereof.

In addition, the functions of the current velocity calculating unit 4, the tidal correction unit 5, the detection area determining unit 6, the current velocity estimating unit 7, and the tsunami detecting unit 8 may be implemented by corresponding processing circuits, or the functions may be collectively implemented by a single processing circuit.

As illustrated in FIG. 2B, when the processing circuit is a CPU 105, the functions of the current velocity calculating unit 4, the tidal correction unit 5, the detection area determining unit 6, the current velocity estimating unit 7, and the tsunami detecting unit 8 are implemented by software, firmware, or a combination of software and firmware.

The software or the firmware is described as a program and stored in a memory 106.

The CPU 105 reads and executes programs stored in the memory 106, thereby implementing the functions of the units. That is, the radar apparatus 1 includes the memory 106 for storing the programs by which processing of each of the functions is resultantly executed when executed by the CPU 105. In addition, the programs cause a computer to execute procedures or methods of the current velocity calculating unit 4, the tidal correction unit 5, the detection area determining unit 6, the current velocity estimating unit 7, and the tsunami detecting unit 8.

Examples of the memory 106 include a nonvolatile or volatile semiconductor memory such as random access memory (RAM), read only memory (ROM), flash memory, erasable programmable ROM (EPROM), and electrically EPROM (EEPROM), a magnetic disk, a flexible disk, an optical disk, a compact disk, a mini disk, a digital versatile disk (DVD), and the like.

Note that, the functions of the current velocity calculating unit 4, the tidal correction unit 5, the detection area determining unit 6, the current velocity estimating unit 7, and the tsunami detecting unit 8 may be partially implemented by dedicated hardware and partially implemented by software or firmware. For example, as for the current velocity calculating unit 4 and the tidal correction unit 5, the functions are implemented by the processing circuit 100 of the dedicated hardware, and as for the detection area determining unit 6, the current velocity estimating unit 7, and the tsunami detecting unit 8, the functions are implemented by the CPU 105 executing the programs stored in the memory 106.

As described above, the processing circuit can implement the above-described functions by the hardware, software, firmware, or a combination thereof.

Next, the operation will be described.

Figure 3:
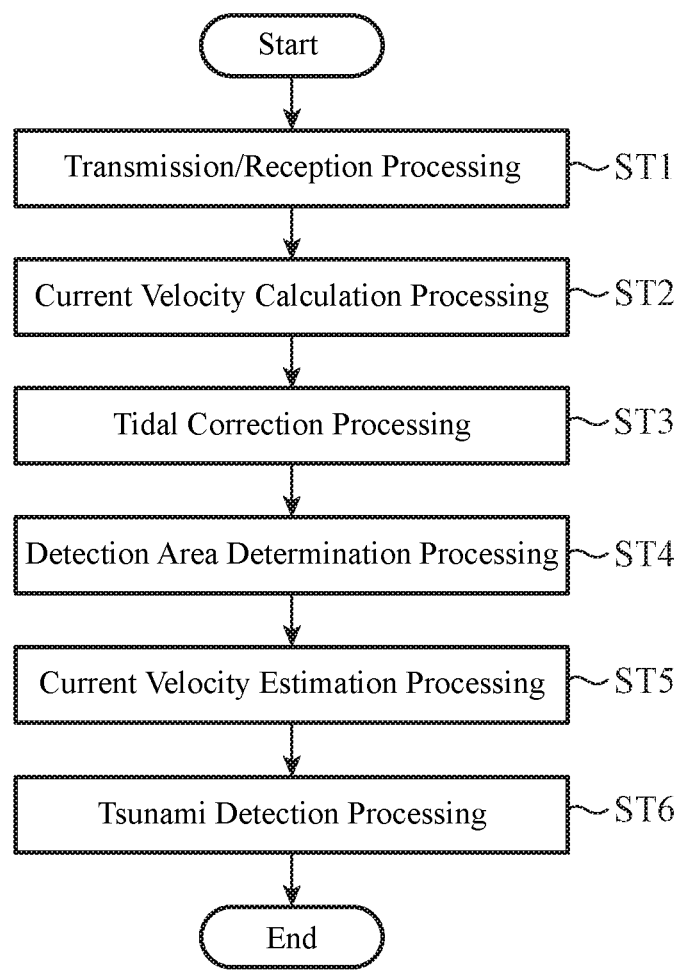
FIG. 3 is a flowchart illustrating operation of the radar apparatus according to Embodiment 1.

FIG. 3 is a flowchart illustrating the operation of the radar apparatus 1, and illustrates a series of processing steps from when the electromagnetic waves are radiated to the sea surface that is the observation area until the tsunami detection processing is executed.

First, in step ST1, transmission/reception processing is performed. In the transmission/reception processing, the transmission unit 2 transmits the electromagnetic waves toward the sea surface in the observation area.

For example, when short-wave or ultrashort-wave electromagnetic waves are transmitted from the transmission unit 2 on the land toward the sea surface, a strong intensity signal is returned from the sea surface wave propagating in the same direction as the radar beam.

This is because, due to the Bragg resonant scattering, the phase of an electromagnetic wave reflected at a certain sea surface matches the phases of electromagnetic waves reflected at the adjacent sea surfaces, and the reflected electromagnetic waves have half the wavelength of the transmitted electromagnetic wave.

The reception unit 3 is installed in the vicinity of the transmission unit 2 or is formed integrally with the transmission unit 2, and receives electromagnetic waves reflected and returned from the sea surface as described above. Then, the reception unit 3 performs amplification processing of the reception signals of the electromagnetic waves, further performs signal processing such as frequency conversion processing, and performs A/D conversion on the reception signals that have experienced the signal processing. The digital signal obtained by the A/D conversion is output from the reception unit 3 to the current velocity calculating unit 4.

Next, in step ST2, current velocity calculation processing is performed. In the current velocity calculation processing, the current velocity calculating unit 4 calculates the sea-surface current velocity for each cell in the observation area by applying Fourier transform to the digital signal input from the reception unit 3 and analyzing the frequency. The sea-surface current velocity data for each cell is output from the current velocity calculating unit 4 to the tidal correction unit 5 and the current velocity database 4a.

In step ST3, tidal correction processing is performed. In the tidal correction processing, the tidal correction unit 5 extracts the tidal component contained in the sea-surface current velocity for each cell, and performs correction to subtract the tidal component from the sea-surface current velocity for each cell. As for a tidal component extraction method, for example, the tidal component may be extracted by using the Kalman filter described in Reference Literature 1 below, or the tidal component may be extracted by applying, to the current velocity data accumulated, a low pass filter such as moving average processing.
(Reference Literature 1) JP 2015-4608 A In addition, the tidal correction unit 5 may calculate a velocity of current obtained by subtracting the tidal component in accordance with Equation (1) below. Here, the suffix i is the cell number assigned to each cell, t is the current time, M is the number of samples to average, and L is the time to terminate averaging process. The symbol $u_{ik}$, is the velocity of current at the sea surface corresponding to a cell of cell number i at a time k, and is a velocity of current calculated by the current velocity calculating unit 4. The symbol $v_i$ is a value obtained by subtracting the tidal component from $u_{it}$, and is the velocity of current at the sea surface corresponding to the cell of cell number i whose tidal component is corrected. Note that, L corresponds to a margin for not using a velocity of current mixed with a tsunami component in the tidal component extraction processing even if a tsunami is arriving at the current time t.

$$v_i = u_{it} - \frac{1}{M} \sum_{k=t-M-L}^{t-1-L} u_{ik} \qquad (1)$$

In step ST4, detection area determination processing is performed. In the detection area determination processing, the detection area determining unit 6 determines the detection area from the observation area. The detection area is a series of areas in which there is a possibility that a tsunami occurs.

In the observation area, there may be one detection area or a plurality of detection areas.

In addition, when there is the plurality of detection areas, the detection areas may overlap each other.

Note that, details of the detection area determination processing will be described later with reference to FIG. 4.

In step ST5, current velocity estimation processing is performed. In the current velocity estimation processing, the current velocity estimating unit 7 estimates the current velocity at the sea-surface of the detection area as the value that is obtained by smoothing the sea-surface current velocities each corresponding to a cell included in the detection area.

For example, as indicated in Equations (2) and (3) below, a value obtained by averaging the sea-surface current velocities in a manner that depends on the observation errors of the current velocity is set as a sea-surface current velocity $V_i$ for each detection area. Here, a suffix, i, is an area number assigned to each detection area. $D_i$ represents a set of cell numbers assigned to cells included in the i-th detection area, and a suffix j is a cell number assigned to a cell of an element of $D_i$. $C_i$ is a constant. A symbol $v_j$ is a sea-surface current velocity corresponding to a cell with the cell number j, and $\sigma_j$ is a standard deviation of observation errors of the current velocity $v_j$.

Note that, the standard deviation $\sigma_j$ of the observation errors is known for each cell, or measured in advance from the dispersion of current velocity data before the arrival of the tsunami.

In addition, a value obtained by integrating the sea-surface current velocities in a manner that depends on the observation errors of the current velocity may be set as the sea-surface current velocity $V_i$ for each detection area.

$$V_i = \frac{1}{C_i} \sum_{j \in D_i} \frac{v_j}{\sigma_j^2} \qquad (2)$$

$$C_i = \sum_{j \in D_i} \frac{1}{\sigma_j^2} \qquad (3)$$

In step ST6, tsunami detection processing is performed. In the tsunami detection processing, the tsunami detecting unit 8 detects the occurrence of the tsunami in the detection area, based on the sea-surface current velocity in the detection area estimated by the current velocity estimating unit 7.

For example, the tsunami detecting unit 8 compares the sea-surface current velocity in the detection area with a detection threshold value, and when detecting that the current velocity exceeds the detection threshold value, determines that the tsunami has occurred in the detection area.

Note that, the tsunami detecting unit 8 determines that no tsunami has occurred when there is no detection area where the sea-surface current velocity exceeds the detection threshold value among the plurality of detection areas in the observation area, and determines that the tsunami has occurred when there is even one detection area where the sea-surface current velocity exceeds the detection threshold value.

The display device 9 displays the distribution of the current-velocity vector estimated by the current velocity estimating unit 7, or the detection information of the occurrence of the tsunami by the tsunami detecting unit 8, upon user operation, for example.

Next, the details of the detection area determination processing will be described.

Figure 4:
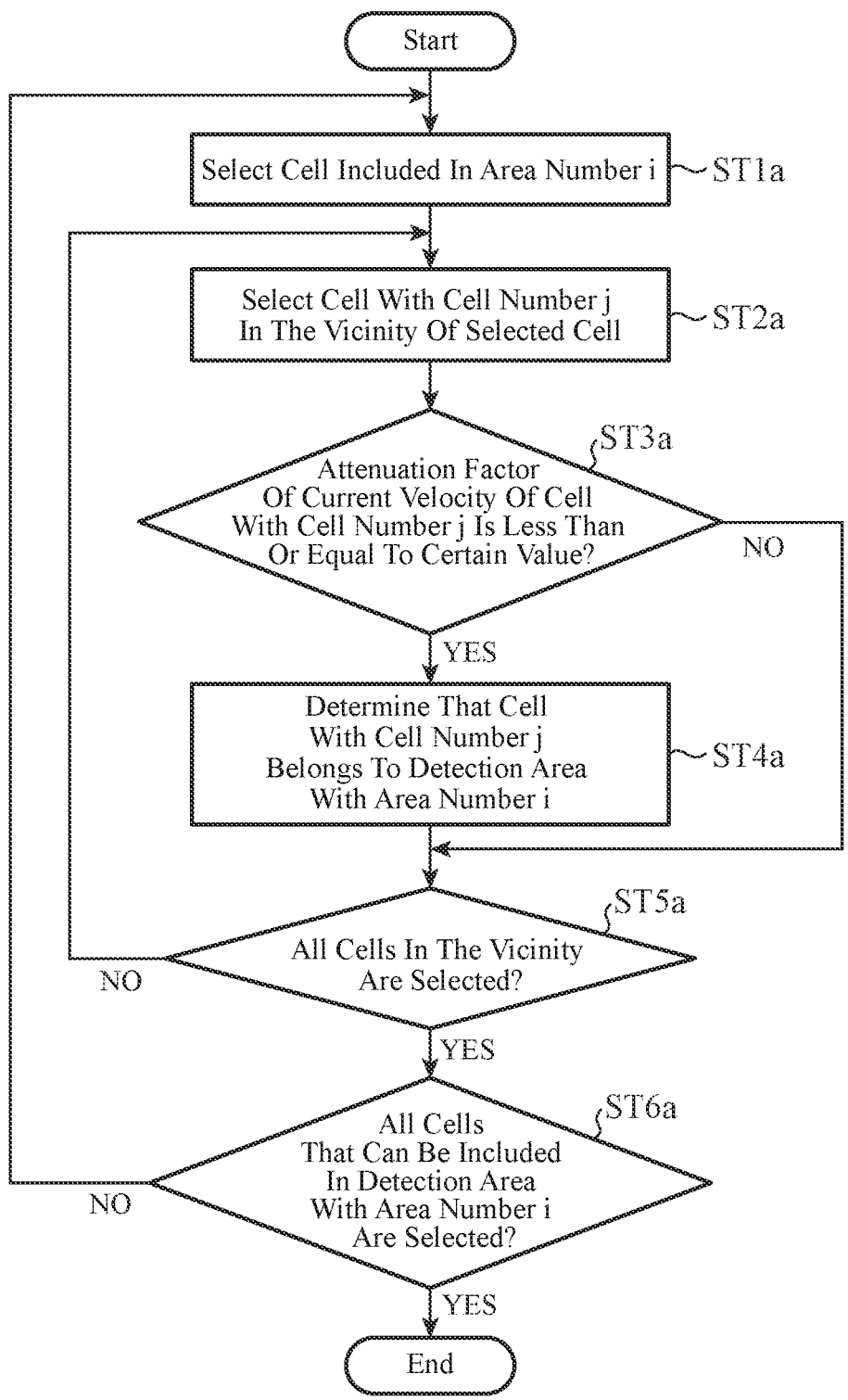
FIG. 4 is a flowchart illustrating details of detection area determination processing.

FIG. 4 is a flowchart illustrating the details of the detection area determination processing, and illustrates a series of processing steps in step ST4 of FIG. 3.

First, the detection area determining unit 6 selects a cell included in the area number i from among all the cells dividing the observation area (step ST1a). Note that, it is assumed that a peak current velocity of a tsunami has arrived at the cell selected here, and cells in the vicinity where the tsunami exists are determined as cells belonging to the detection area with area number i. Hereinafter, a cell in which it is assumed that the peak current velocity of the tsunami has arrived, is called a cell of interest.

The detection area determining unit 6 selects a cell with cell number j in the vicinity of the cell of interest (step ST2a). For example, the detection area determining unit 6 selects cells one by one within a certain distance centered on the cell of interest. Here, each of the cells selected in this way is called a processing target cell.

Next, the detection area determining unit 6 inputs the sea-surface current velocity data corresponding to the cell of interest and the sea-surface current velocity data corresponding to the cell of cell number j from the sea-surface current velocities corrected for each cell by the tidal correction unit 5.

Then, the detection area determining unit 6 calculates an attenuation factor $\alpha$ that represents a degree of attenuation of the peak current velocity of the tsunami assumed for the cell of interest in the cell with cell number j.

Subsequently, the detection area determining unit 6 determines whether or not the attenuation factor $\alpha$ is less than or equal to a constant value (step ST3a). Note that, the constant value only needs to be a value that can specify the minimum value of the spread of the tsunami assumed for a cell a, that is, the minimum value of the wavelength of the tsunami, for example, a value of about 0.9.

If the attenuation factor $\alpha$ is larger than the constant value (step ST3a; NO), then the processing proceeds to step ST5a without performing the processing of step ST4a.

On the other hand, if the attenuation factor $\alpha$ is less than or equal to the constant value (step ST3a; YES), then the detection area determining unit 6 determines that the cell with cell number j belongs to the detection area with area number i (step ST4a). In step ST5a, the detection area determining unit 6 checks whether or not all the cells in the vicinity of the cell of interest have been selected as processing target cells.

If all the cells have not been selected (step ST5a; NO), then the detection area determining unit 6 selects the next cell in the vicinity of the cell of interest as the processing target cell, and repeats the above series of processing steps from step ST2a.

When all the cells in the vicinity of the cell of interest have been selected (step ST5a; YES), the detection area determining unit 6 confirms whether or not all the cells belonging to the area number i have been selected as the cell of interest (step ST6a).

Here, if there is a cell not selected as a cell of interest (step ST6a; NO), then the detection area determining unit 6 returns to step ST1a and repeats the above series of processing steps from step ST1a with this cell as a cell of interest.

If all the cells have been selected as a cell of interest (step ST6a; YES), then the detection area determining unit 6 ends the processing. Then, the processing proceeds to step ST5 in FIG. 3.

Note that, in FIG. 4, a case has been described in which the detection area is determined based on the distance between the processing target cell and the cell of interest, and the attenuation factor $\alpha$ of the sea-surface current velocity corresponding to the processing target cell with respect to the sea-surface current velocity corresponding to the cell of interest. That is, the detection area determining unit 6 determines the detection area, based on the relationship between the distance over the cells and the change in velocity of the observation target.

In addition to the relationship described above, the detection area determining unit 6 may determine the detection area, based on the relationship between the distance over the cells and the direction relation of velocity vectors of the observation target over the cells. This will be described in detail below.

Figure 5:
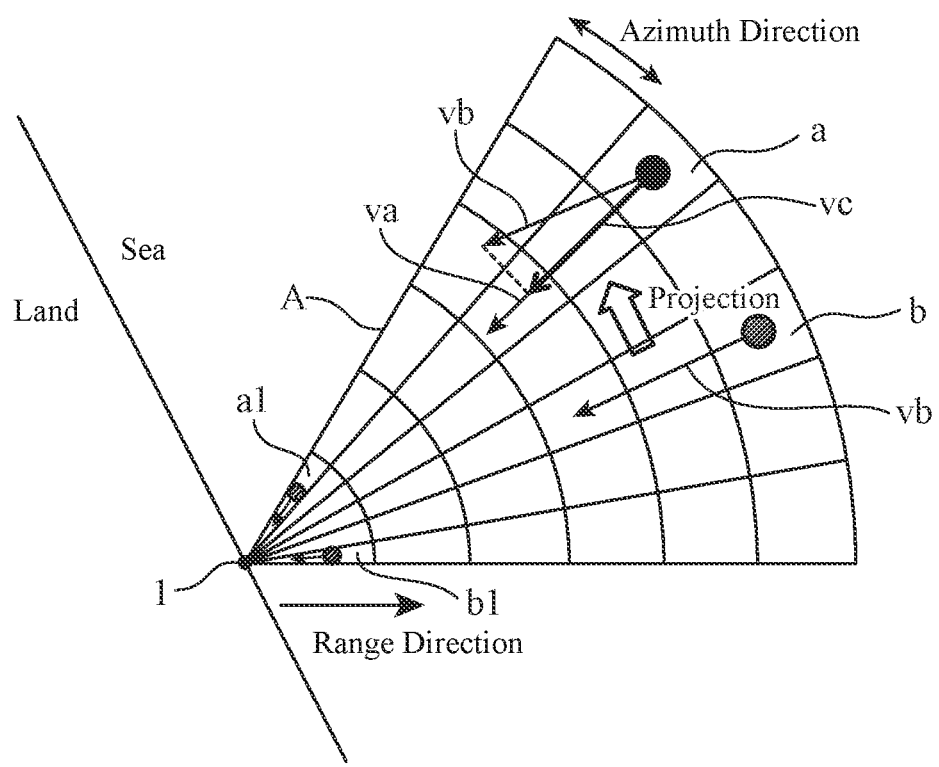
FIG. 5 is a diagram illustrating an outline of detection area determination processing.

FIG. 5 is a diagram illustrating an outline of detection area determination processing based on the relationship between the distance over cells and the direction relation of velocity vectors of the observation target in the cells. In FIG. 5, the radar apparatus 1 is installed on the land and observes the sea-surface current velocity. A fan-shaped portion spread out from the radar apparatus 1 is an observation area A within a radar coverage area, and an individual area obtained by dividing the observation area A in the range direction and the azimuth direction is a cell. Note that, a current-velocity vector at sea surface is a vector directed from the center of the cell toward the radar apparatus 1.

If a cell, a, is selected as the cell of interest, then the detection area determining unit 6 selects a cell, b, existing within a certain distance from the cell a as the processing target cell. Here, the current-velocity vector at the sea surface corresponding to the cell a is va, and the current-velocity vector at the sea surface corresponding to the cell b is vb.

Subsequently, the detection area determining unit 6 projects the current-velocity vector vb at the sea surface corresponding to the cell b onto the cell a, and calculates a projection vector vc of current velocity.

Next, the detection area determining unit 6 calculates an attenuation factor $\alpha$ of the sea-surface current velocity corresponding to the cell b with respect to the sea-surface current velocity corresponding to the cell a. The attenuation factor $\alpha$ is an attenuation factor of the sea-surface current velocity corresponding to a distance between the cell of interest and the processing target cell. The attenuation factor $\alpha$ reflects an assumption that a physical phenomenon in which the tsunami current velocity is large near the center of the cell of interest and that the tsunami current velocity decreases as a distance from the cell of interest increases.

Note that, if a wavelength of a tsunami assumed for the cell of interest is long, the attenuation factor $\alpha$ becomes small even when the distance between the cell of interest and the processing target cell is long.

On the other hand, if a wavelength of a tsunami assumed for the cell of interest is short, the attenuation factor $\alpha$ increases even when the distance between the cell of interest and the processing target cell is short.

Furthermore, the detection area determining unit 6 calculates an attenuation factor $\beta$ that represents a degree of attenuation of the current-velocity vector va due to a difference in direction between the current-velocity vector va and the current-velocity vector vb.

The detection area determining unit 6 calculates $\alpha \times \beta$ obtained by multiplying the attenuation factor $\alpha$ by the attenuation factor $\beta$, compares $\alpha \times \beta$ with a constant value, and determines a processing target cell whose $\alpha \times \beta$ is less than or equal to the constant value as a cell belonging to the same detection area as the cell of interest a.

Since the detection area is determined in this way, cells having close distance between the cells but in which directions of the respective current-velocity vectors are largely different from each other, for example, a cell a1 and a cell b1 illustrated in FIG. 5, are not included in the same detection area. If there is a peak current velocity of the tsunami in the cell a, and if α×β is less than or equal to the constant value between the cell a and the cell b, the peak current velocity of the tsunami in the cell b also has about the same value as in the cell a.

As described above, in the radar apparatus 1 according to Embodiment 1, the detection area determining unit 6 determines the detection area at which there is a possibility that the tsunami occurs. Next, the current velocity estimating unit 7 estimates the current velocity at the sea-surface of the detection area as the value that is obtained by smoothing the sea-surface current velocities each corresponding to a cell included in the detection area. The tsunami detecting unit 8 detects the occurrence of the tsunami in the detection area, based on the sea-surface current velocity estimated by the current velocity estimating unit 7.

With this configuration, accuracy of estimating the current velocity is improved, and accuracy of detecting an occurrence of tsunami, a detection target event, can be improved.

In addition, in the radar apparatus 1 according to Embodiment 1, the current velocity estimating unit 7 estimates the current velocity at the sea surface of the detection area as the value that is obtained by integrating or averaging the sea-surface current velocities in a manner that depends on the observation errors of sea-surface current velocity for the cells included in the detection area. In particular, the current velocity estimating unit 7 performs weighted averaging of the sea-surface current velocities in accordance with the standard deviation σ of the observation errors of the current velocity.

With this configuration, the sea-surface current velocity can be accurately estimated.

Note that, in Embodiment 1, a case has been described in which the detection target event is a tsunami; however this is not a limitation. It is also effective for detection of wind or cloud that is a volume target exceeding the size of the individual cell.

For example, the function of the radar apparatus 1 may be used in a laser radar for observing wind velocity. In this case, wind shear or downburst is a detection target event, based on the observation information on the wind velocity.

In addition, the function of the radar apparatus 1 may be used in a Doppler radar for observing the moving velocity of precipitation particles in a cloud. In this case, the movement of the cloud is a detection target event.

Embodiment 2

In Embodiment 2, it is assumed that the water depth for each cell is known, and the size of a detection area is changed in a manner that depends on its water depth.

Figure 6:
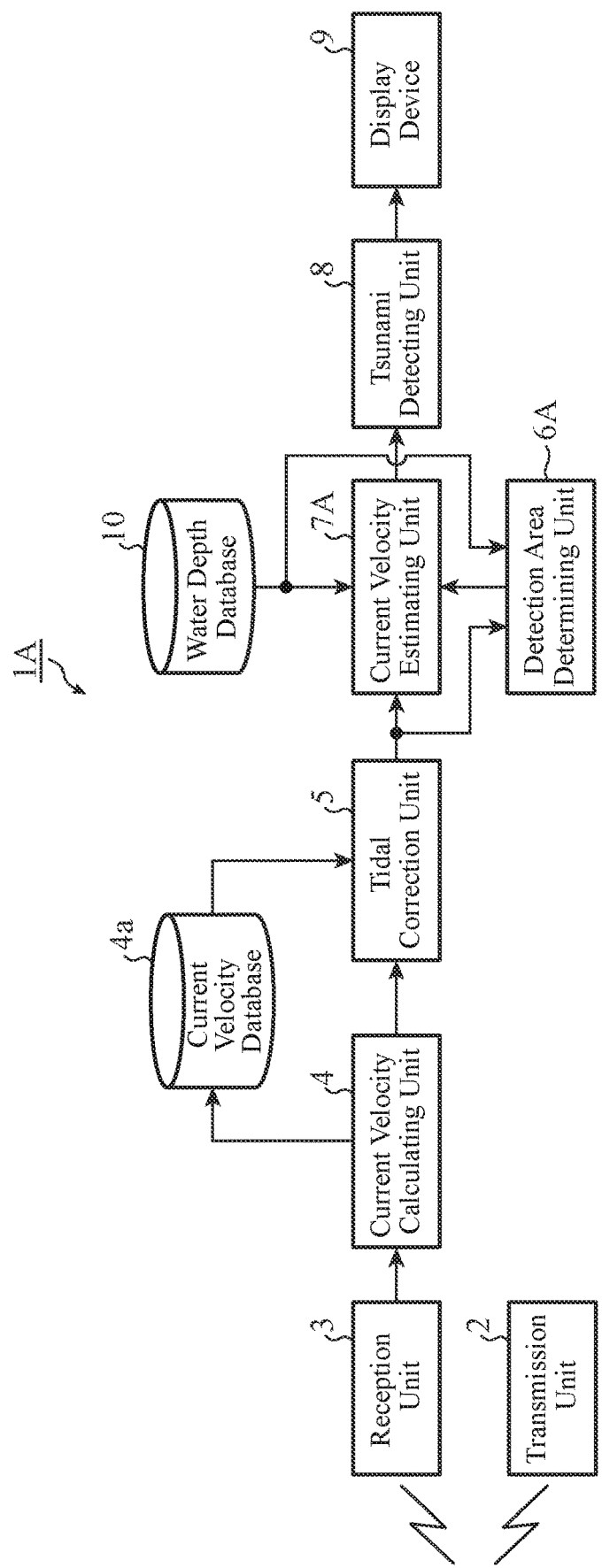
FIG. 6 is a block diagram illustrating a configuration of a radar apparatus according to Embodiment 2 of the present disclosure.

FIG. 6 is a block diagram illustrating a configuration of a radar apparatus 1A according to Embodiment 2, and illustrates a case in which the radar apparatus 1A is an ocean radar apparatus. In FIG. 6, the same components as those in FIG. 1 are denoted by the same reference numerals, and the description thereof is omitted. The radar apparatus 1A includes components similar to those of the radar apparatus 1, except that the radar apparatus 1A includes a detection area determining unit 6A, a current velocity estimating unit 7A, and a water depth database 10.

The water depth database 10 is a database for storing water depth data each corresponding to each of a plurality of cells dividing the observation area, and is built on a storage area of a storage device such as RAM or a hard disk. The water depth data stored in the water depth database 10 can be read from the detection area determining unit 6A and the current velocity estimating unit 7A.

Note that, the storage device in which the water depth database 10 is built may be a storage device incorporated in the radar apparatus 1A, or may be a storage device provided outside the radar apparatus 1A.

That is, the water depth database 10 only needs to be built in a storage device from which the detection area determining unit 6A and the current velocity estimating unit 7A can read the data.

The detection area determining unit 6A changes the size of the detection area in a manner that depends on the water depth corresponding to each cell.

Figure 7A:
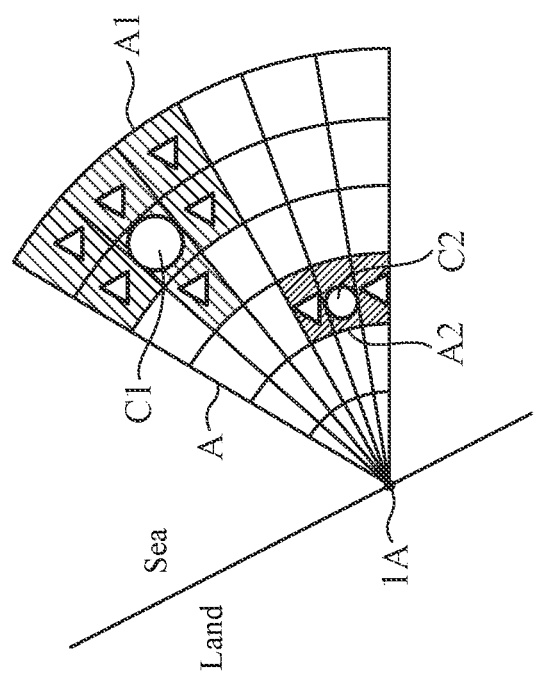
FIG. 7A is a diagram illustrating an outline of processing of changing the size of a detection area in accordance with the water depth corresponding to each cell.
Figure 7B:
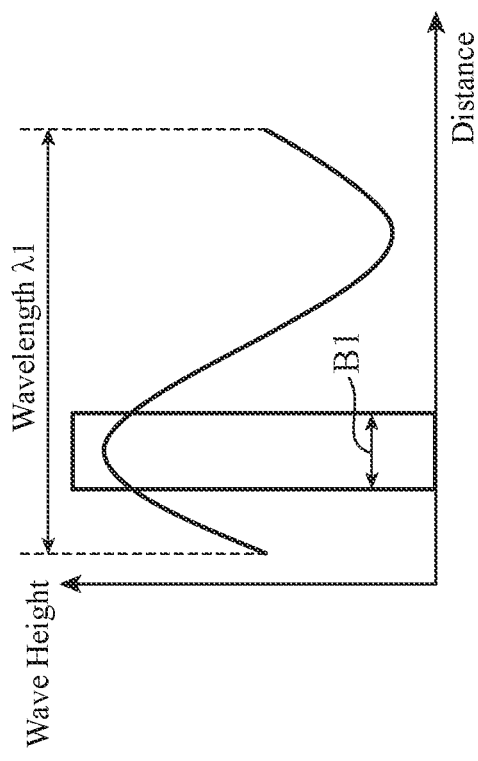
FIG. 7B is a graph illustrating a relationship between the wave height of a tsunami and a distance from a cell of interest in a case where the water depth is deep.

FIG. 7A is a diagram illustrating an outline of processing of changing the size of the detection area in a manner that depends on the water depth corresponding to each of the cells. Note that, a circle symbol illustrated in FIG. 7A is a cell of interest, and a triangle symbol is an adjacent cell of the cell of interest. FIG. 7B is a graph illustrating a relationship between the wave height of a tsunami and a distance from a cell of interest in a case in which the water depth is deep, and FIG. 7C is a graph illustrating the relationship between the wave height of the tsunami and the distance from the cell of interest in a case in which the water depth is shallow.

In FIG. 7A, the water depth corresponding to a cell of interest C1 is deeper than the water depth corresponding to a cell of interest C2. In this case, a relationship between the wave height of the tsunami and a distance from the cell of interest C1 is the relationship illustrated in FIG. 7B, and a relationship between the wave height of the tsunami and a distance from the cell of interest C2 is the relationship illustrated in FIG. 7C.

Here, the wavelength λ of a tsunami can be expressed by an equation $\lambda = T\sqrt{gh}$. In this equation T is a period of the tsunami, g is gravitational acceleration, and h is a water depth.

Figure 7C:
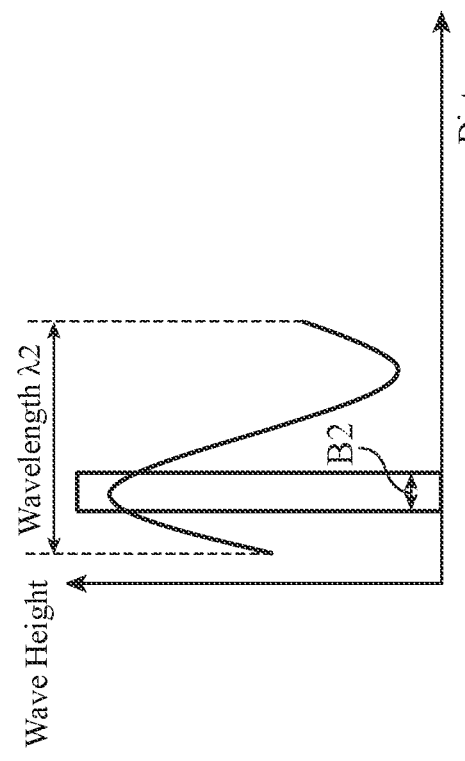
FIG. 7C is a graph illustrating the relationship between the wave height of the tsunami and the distance from the cell of interest in a case where the water depth is shallow.

Therefore, as illustrated in FIGS. 7B and 7C, for a cell whose water depth is deep a wavelength λ1 of a tsunami is long, and for a cell whose water depth is shallow a wavelength λ2 of a tsunami is short.

Since the wavelength of the tsunami varies in accordance with the water depth as described above, the detection area determining unit 6A increases a size B1 of a detection area A1 to which the cell whose water depth is deep belongs, and decreases a size B2 of a detection area A2 to which the cell whose water depth is shallow belongs.

For example, the detection area determining unit 6A calculates an attenuation factor α that represents a degree of attenuation of the peak current velocity of the tsunami assumed for the cell C1 in an adjacent cell.

Since the water depth of the cell of interest C1 is deep and the wavelength of the tsunami assumed for the cell of interest C1 is long, the attenuation factor α is small even when a distance between the cell of interest C1 and the adjacent cell is long.

Therefore, when an adjacent cell whose attenuation factor α is less than or equal to the constant value is selected in step ST3a of FIG. 4, many cells are selected whose attenuation factor α is less than or equal to the constant value. As a result, the size B1 of the detection area A1 is increased.

Similarly, the detection area determining unit 6A calculates an attenuation factor α that is a ratio of the peak current velocity of the sea surface corresponding to an adjacent cell with respect to the peak current velocity of the tsunami assumed for the cell C2.

Since the water depth of the cell of interest C2 is shallow and the wavelength of the tsunami assumed for the cell of interest C2 is short, the attenuation factor α increases even when a distance between the cell of interest C2 and the adjacent cell is short.

Therefore, when an adjacent cell whose attenuation factor α is less than or equal to the constant value is selected in step ST3a of FIG. 4, less cells are selected whose attenuation factor α is less than or equal to the constant value. As a result, the size B2 of the detection area A2 is decreased.

In addition, the current velocity estimating unit 7A is a component embodying the velocity estimating unit, and estimates the current velocity at the sea-surface of the detection area as the value that is obtained by performing weighted averaging of the sea-surface current velocities in accordance with the water depth of each cell included in the detection area. That is, the current velocity estimating unit 7A not only simply integrates or averages the sea-surface current velocities corresponding to the cells, but also performs weighted averaging so that the current velocity of the cell whose water depth is deep becomes small and the current velocity of the cell whose water depth is shallow becomes large.

For example, the current velocity estimating unit 7A performs weighted averaging of the current velocities in accordance with the water depths and observation errors in accordance with Equations (4), (5) and (6) below.

Here, a suffix i is an area number assigned to each detection area. $D_i$ represents a set of cell numbers assigned to cells included in the i-th detection area, and a suffix j is a cell number assigned to a cell of an element of $D_i$. $C_i$ is a constant.

A symbol $v_j$ is a current velocity at the sea surface corresponding to the cell of cell number j, and $v_i'$ is a current velocity after weighted averaging of $v_i$. A symbol $\sigma_j$ is a standard deviation of observation errors of the current velocity $v_j$. A symbol $h_j$ indicates a water depth corresponding to the cell of cell number j. $M_i$ is an amount of flow when water of the water depth $h_i$ moves at the current velocity $v_i'$ in the detection area of the area number i.

Note that, the standard deviation $\sigma_j$ of the observation errors is known for each cell, or measured in advance from variation of the current velocity data before the arrival of the tsunami.

$$M_i = \frac{1}{C_i} \sum_{j \in D_i} \frac{v_j}{\sigma_j^2 h_j} \quad (4)$$

$$C_i = \sum_{j \in D_i} \frac{1}{\sigma_j^2 h_j} \quad (5)$$

$$v_i' = \frac{M_i}{h_i} \quad (6)$$

Figure 8B:
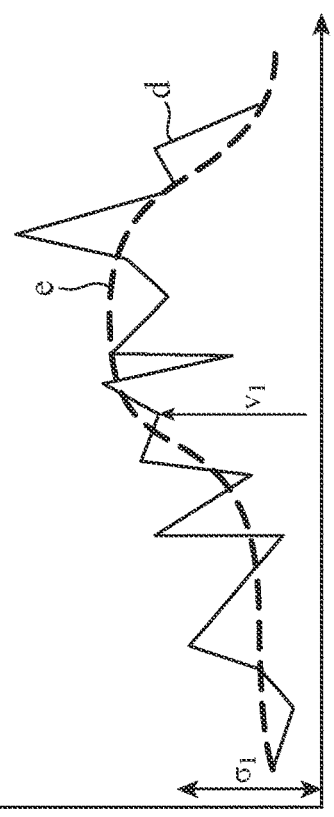
FIG. 8B is a graph illustrating a relationship between a tsunami current velocity and time in the case where the water depth is deep.
Figure 8C:
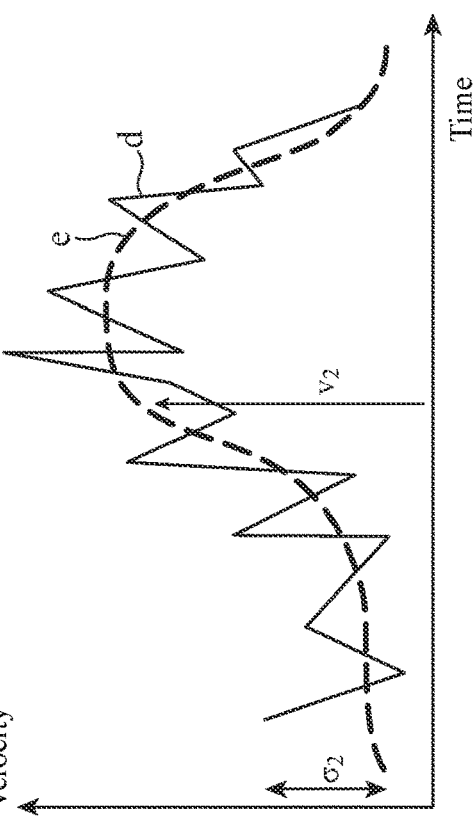
FIG. 8C is a graph illustrating the relationship between the tsunami current velocity and the time in the case where the water depth is shallow.
Figure 8A:
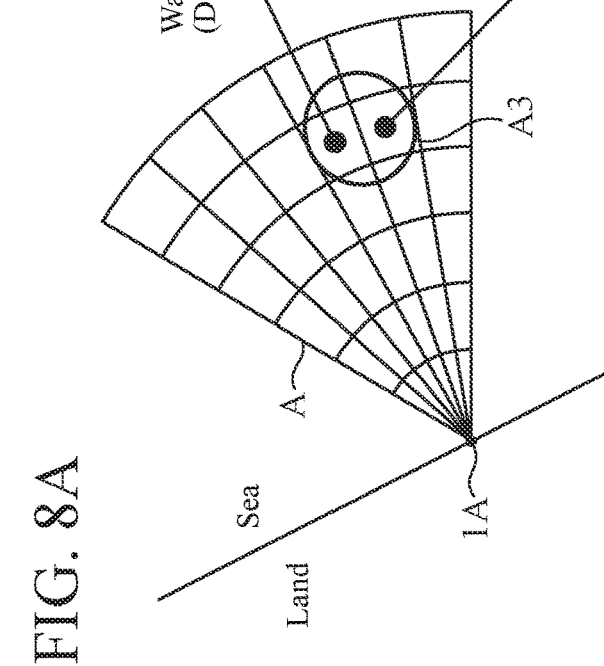
FIG. 8A is a diagram illustrating a detection area including cells having different water depths.

FIG. 8A is a diagram illustrating a detection area A3 including cells having different water depths. FIG. 8B is a graph illustrating a relationship between a tsunami current velocity and time in the case in which the water depth is deep, and FIG. 8C is a graph illustrating the relationship between the tsunami current velocity and the time in the case in which the water depth is shallow. Note that, in FIGS. 8B and 8C, a solid line d is a sea-surface current velocity observed by the current velocity calculating unit 4, and a dotted line e is a true sea-surface current velocity.

The tsunami is a phenomenon in which sea water of a constant amount of flow surges over the land from the sea side, and its current velocity is a physical quantity obtained by dividing the amount of flow by the water depth as indicated in Eq. (6). For this reason, as illustrated in FIGS. 8B and 8C, a sea-surface current velocity $v_1$ in the cell whose water depth is deep is smaller than a sea-surface current velocity $v_2$ in the cell whose water depth is shallow. As a result, a value of a standard deviation $\sigma_1$ of the observation errors of the current velocity $v_1$ is larger than a value of a standard deviation $\sigma_2$ of the observation errors of the current velocity $v_2$.

Thus, the current velocity estimating unit 7A performs weighted averaging of the flow velocities in inverse proportion to the water depth and the observation error in accordance with Eqs. (4), (5) and (6). As a result, the observation error of current velocity is appropriately suppressed, and the detection accuracy of the tsunami can be improved.

As described above, in the radar apparatus 1A according to Embodiment 2, the detection area determining unit 6A changes the size of the detection area in a manner that depends on the water depth corresponding to each of the cells. In particular, the detection area to which the cell whose water depth is deep belongs is increased, and the detection area to which the cell whose water depth is shallow belongs is decreased.

As a result, in a cell having a deep water depth and a large variation in the current velocity, smoothing is performed with the current velocities of many cells, so that the smoothing effect can be enhanced of the current velocities in the detection area.

In addition, in the radar apparatus 1A according to Embodiment 2, the current velocity estimating unit 7A estimates the current velocity at the sea-surface of the detection area as the value that is obtained by performing weighted averaging of the sea-surface current velocities in accordance with the water depth of each cell included in the detection area. With this configuration, the observation errors of current velocity can be appropriately suppressed.

Embodiment 3

In Embodiment 1, a case has been described in which the detection area is determined based on the relationship between the distance between the cells, the change in each of the observation target velocities, and the direction relationship of the observation target velocity vectors between the cells.

On the other hand, in Embodiment 3, a detection area including cells belonging to a wavefront candidate of a tsunami assumed in an observation area is determined based on a distance between the wavefront candidate of the tsunami and each of the cells.

Figure 9:
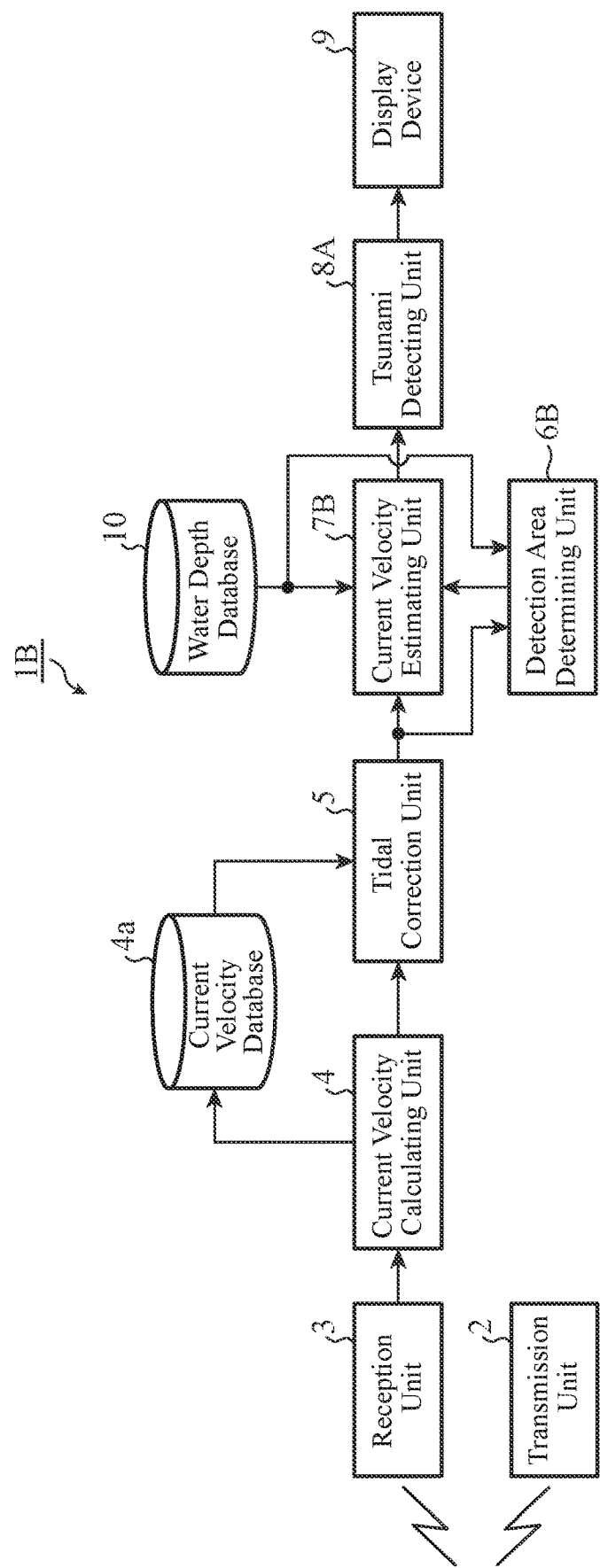
FIG. 9 is a block diagram illustrating a configuration of a radar apparatus according to Embodiment 3 of the present disclosure.

FIG. 9 is a block diagram illustrating a configuration of a radar apparatus 1B according to Embodiment 3, and illustrates a case in which the radar apparatus 1B is an ocean radar apparatus. In FIG. 9, the same components as those in FIGS. 1 and 6 are denoted by the same reference numerals, and description thereof is omitted. The radar apparatus 1B includes components similar to the radar apparatus 1A, except that the radar apparatus 1B includes a detection area determining unit 6B, a current velocity estimating unit 7B and a tsunami detecting unit 8A.

The detection area determining unit 6B determines the detection area including the cells belonging to the wavefront candidate of the tsunami assumed in the observation area, based on the distance between the wavefront candidate of the tsunami and each of the cells.

Figure 10:
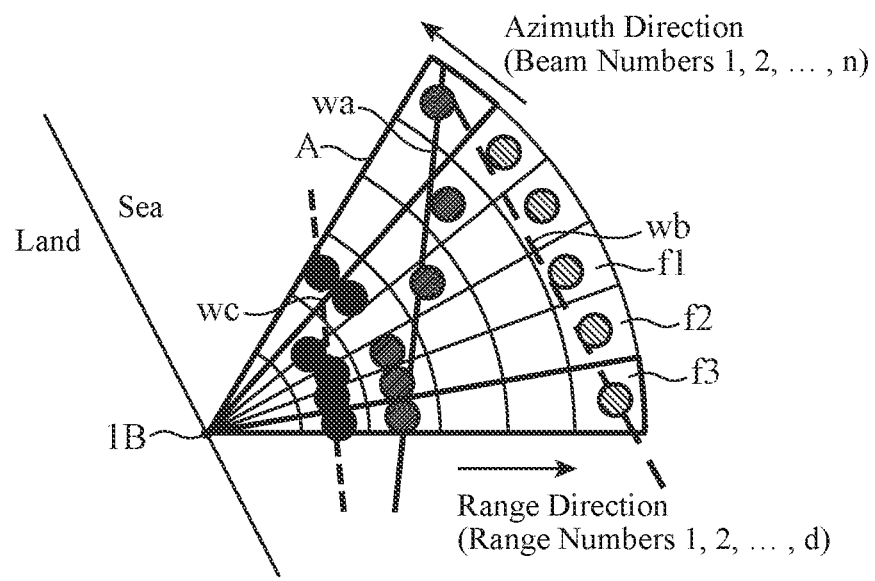
FIG. 10 is a diagram illustrating a relationship between wavefront candidates of a tsunami and cells.

FIG. 10 is a diagram illustrating a relationship between wavefront candidates wa, wb, and wc of the tsunami and the cells. In FIG. 10, the number of ranges in one beam formed by the radar apparatus 1B is d (range number=1, 2, ..., d), and the number of beams formed by the radar apparatus 1B is n (beam number=1, 2, ..., n). At this time, the detection area determining unit 6B assumes wavefront candidates of d×d pieces that is the number of combinations of cells corresponding to beams at both side ends of a radar coverage area.

In addition, the detection area determining unit 6B may set straight lines connecting two different cells in all the cells within the radar coverage area as wavefront candidates. In this case, the wavefront candidates are assumed of (n×d)×(n×d) pieces obtained by multiplying the number of cells within the radar coverage area by the number of cells within the radar coverage area.

However, taking into consideration that this is a huge number and the calculation load becomes large, the number of wavefront candidates may be reduced to the number of combinations of cells at the outer periphery of the radar coverage area.

That is, the detection area determining unit 6B assumes wavefront candidates of (n+d)×(n+d) pieces from combinations of n cells farthest from the radar apparatus 1B and d cells corresponding to the beams at both side ends.

Assuming the number of wavefront candidates as described above, the detection area determining unit 6B selects cells close to a wavefront candidate for each beam, as a cell belonging to the wavefront candidate.

For example, since a cell f1 at the farthest in a beam of the beam number n−2 is within a certain distance from the wavefront candidate wb, the cell f1 is selected as a cell belonging to the wavefront candidate wb.

Similarly, since a cell f2 at the farthest in a beam of the beam number n−1 is within the certain distance from the wavefront candidate wb, the cell f2 is selected as a cell belonging to the wavefront candidate wb.

Furthermore, since a cell f3 at the farthest in a beam of the beam number n is within the certain distance from the wavefront candidate wb, the cell f3 is selected as a cell belonging to the wavefront candidate wb.

The detection area determining unit 6B selects cells belonging to the wavefront candidate of the tsunami as described above, and determines a detection area including the cells selected.

In addition, the detection area determining unit 6B outputs, to the current velocity estimating unit 7B, the cells belonging to the wave front candidate, and an angle θ formed by a normal vector of the wavefront candidate and a current-velocity vector at a sea surface corresponding to each cell included in the detection area.

The current velocity estimating unit 7B is a concrete form of the velocity estimating unit, and selects sea-surface current velocities corresponding to the cells included in the detection area among the sea-surface current velocities corrected by the tidal correction unit 5.

Then, the current velocity estimating unit 7B integrates or averages the selected current velocities in a manner that depends on the water depth and observation error of current velocity for each cell included in the detection area, and estimates the current velocity at the sea-surface of the detection area as the value obtained.

Note that, as described above, the current velocities to be integrated or averaged may be values corrected in a manner that depends on the angle formed by the sea-surface velocity vector corresponding to each cell included in the detection area and the normal vector of the wavefront candidate of the tsunami.

For example, the current velocity estimating unit 7B performs weighted averaging of the current velocities in accordance with the water depth and observation error for each detection area to which the wavefront candidate belongs in accordance with Equations (7), (8) and (9) below.

Here, a suffix i is an area number assigned to each detection area, and corresponds to a number for each wavefront candidate. $E_i$ represents a set of cell numbers assigned to cells belonging to the i-th wavefront candidate, and a suffix j is a cell number assigned to a cell of an element of $E_i$. $C_i$ is a constant.

A symbol $\theta_i$ is an angle formed by a normal vector of a wavefront candidate of the area number i and a current-velocity vector at a sea surface in a detection area of the area number i. In addition, $\theta_j$ is an angle formed by the normal vector of the wavefront candidate of the area number i and the current-velocity vector at the sea surface corresponding to the cell of cell number j.

A symbol $v_j$ is a current-velocity at the sea surface corresponding to the cell of cell number j, and $v_i'$ is a current velocity after weighted averaging of $v_i$. A symbol $\sigma_j$ is a standard deviation of observation errors of the current velocity $v_j$. A symbol $h_j$ indicates a water depth corresponding to the cell of cell number j. A symbol $h_i'$ represents a water depth of a cell in which the angle $\theta_i$ is the smallest.

Cos $\theta_i$ is a reduction ratio of the current-velocity vector at the sea surface in the detection area of the area number i with respect to the normal vector of the wavefront candidate of the area number i. Cos $\theta_j$ is a reduction ratio of the current-velocity vector at the sea surface corresponding to the cell of cell number j with respect to the normal vector of the wavefront candidate of the area number i. As indicated in Eq. (7) below, by multiplying the current velocity $v_j$ by cos $\theta_j$, the current velocity $v_j$ is corrected to a value corresponding to cos $\theta_j$.

Furthermore, $M_i$ is an amount of flow when water of the water depth $h_i'$ moves at the current velocity $v_i'$ in the detection area of the area number i.

Note that, the standard deviation $\sigma_j$ of the observation errors is known for each cell, or measured in advance from variation of the current velocity data before the arrival of the tsunami.

$$M_i = \frac{1}{C_i} \sum_{j \in E_i} \frac{\cos\theta_j v_j}{\sigma_j^2 h_j} \quad (7)$$

$$C_i = \sum_{j \in D_i} \frac{\cos^2\theta_i}{\sigma_j^2 h_j} \quad (8)$$

$$v_i' = \frac{M_i}{h_i'} \quad (9)$$

As described above, the current velocity estimating unit 7B estimates the amount of flow $M_i$ or the current velocity $v_i'$ by using the angle θ formed by the normal vector of the wavefront candidate of the tsunami and each of the sea-surface current-velocity vectors corresponding to the cells.

Figure 11:
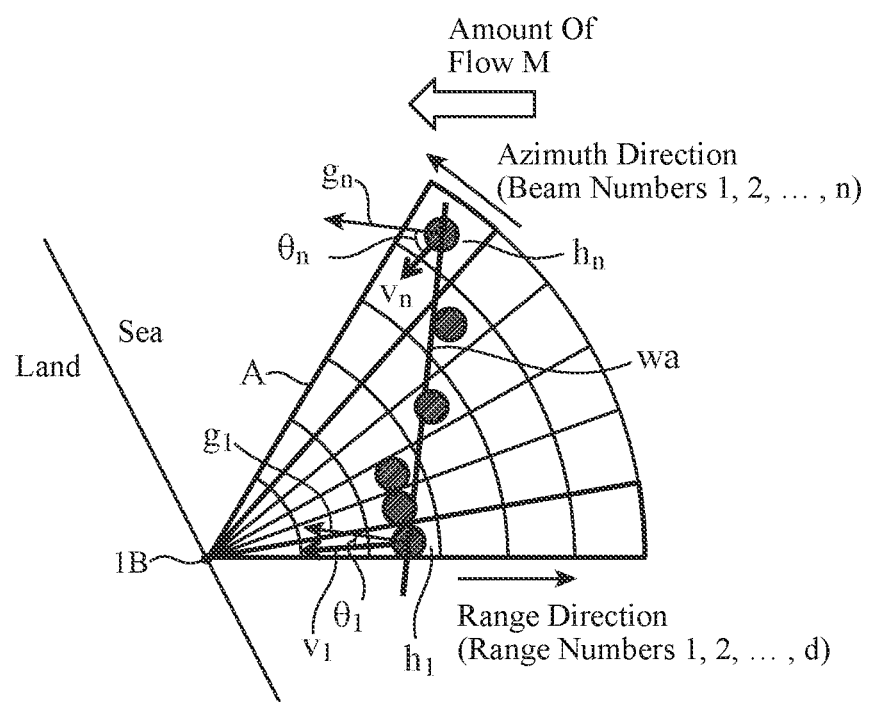
FIG. 11 is a diagram illustrating a relationship between a wavefront candidate of a tsunami and a reduction ratio of a current-velocity vector.

FIG. 11 is a diagram illustrating a relationship between the wavefront candidate wa of the tsunami and the reduction ratio of the current-velocity vector.

In FIG. 11, a current-velocity vector $v_n$ at a sea surface corresponding to a cell $h_n$ has a large angle $\theta_n$ formed with a normal vector $g_n$ of the wavefront candidate wa, and is nearly vertical to the normal vector $g_n$. Since a reduction ratio $\cos \theta_n$ is close to 0, a current velocity at a sea surface corresponding to such a cell $h_n$ does not contribute much to the estimation of the sea-surface current velocity $v_i'$ or the amount of flow $M_i$ in the detection area to which the wavefront candidate wa belongs.

On the other hand, a current-velocity vector $v_1$ at the sea surface corresponding to a cell $h_1$ has a small angle $\theta_1$ formed with a normal vector $g_1$ of the wavefront candidate wa, and nearly parallel to the normal vector $g_1$. Since a reduction ratio $\cos \theta_1$ is close to 1, a sea-surface current velocity corresponding to such a cell $h_1$ greatly contributes to the estimation of the sea-surface current velocity $v_i'$ or the amount of flow $M_i$ in the detection area to which the wavefront candidate wa belongs.

That is, by using a cell having a current-velocity vector of a smaller angle $\theta$ formed with the normal vector of the wavefront candidate among the cells included in the detection area to which the wavefront candidate belongs, accuracy of estimating a tsunami current velocity is improved.

The tsunami detecting unit 8A detects occurrence of the tsunami in the detection area, based on the sea-surface current velocity estimated by the current velocity estimating unit 7B. For example, similarly to Embodiment 1, the sea-surface current velocity estimated by the current velocity estimating unit 7B is compared with a detection threshold value, and when the sea-surface current velocity exceeds the detection threshold value, it is determined that the tsunami has occurred in the detection area.

Note that, the tsunami detecting unit 8A may change the detection threshold value in a manner that depends on the number of cells included in the detection area. For example, when the number of cells included in the detection area, that is, the number of cells belonging to the wavefront candidate is larger than a constant value, the detection threshold value is changed to a value smaller than the previous value.

As a result, tsunami detection corresponding to the number of cells included in the detection area is possible.

In addition, the tsunami detecting unit 8A may change the detection threshold value in a manner that depends on a probability of occurrence of the tsunami associated with the angle $\theta$ formed by each of the sea-surface velocity vectors corresponding to the cells included in the detection area and the normal vector of the wavefront candidate of the tsunami.

For example, when the probability of occurrence of the tsunami is obtained in advance for the angle $\theta$, the detection threshold value to be compared with a current velocity having the angle $\theta$ with a high occurrence probability of the tsunami is changed to a value smaller than the previous value.

As a result, a tsunami wavefront with a high probability of occurrence of the tsunami is easily detected.

Furthermore, the tsunami detecting unit 8A may perform calculation of a wave height value of the tsunami and prediction of arrival of the tsunami, based on sea-surface current velocity information corresponding to a cell in a beam orthogonal to the detected wavefront of the tsunami.

The current-velocity vector at the sea surface corresponding to the cell for the beam orthogonal to the wavefront of the tsunami is not projected in a direction toward the radar apparatus 1B (radar sight direction), and therefore the current-velocity information about sea surface is accurate current velocity information about tsunami.

Thus, as described in the following Reference Literature 2, for example, if a one-dimensional shallow water equation is used from the above current velocity information, the wave height value of the tsunami can be accurately calculated, and further, the prediction of arrival of the tsunami can be accurately performed.

(Reference Literature 2) T. Yamada, et al., "Radar Data Assimilation for a Tsunami Simulation Model Using Kalman Filter", International Conference on Space, Aeronautical and Navigational Electronics 2015 (ICSANE 2015), vol. 115, no. 320, SANE 2015-63, pp. 75-80.

As described above, in the radar apparatus 1B according to Embodiment 3, the detection area determining unit 6B determines the detection area including the cells belonging to the wavefront candidate of the tsunami assumed in the observation area, based on the distance between the wavefront candidate of the tsunami and each of the cells. The current velocity estimating unit 7B smoothes the sea-surface current velocities corresponding to the cells included in the detection area and estimates the current velocity at the sea-surface in the detection area as the smoothed value. The tsunami detecting unit 8A detects the occurrence of the tsunami in the detection area, based on the sea-surface current velocity estimated by the current velocity estimating unit 7B. With this configuration, accuracy of estimating the current velocity becomes high, and accuracy can be improved of detecting the occurrence of the tsunami that is the detection target event.

In addition, in the radar apparatus 1B according to Embodiment 3, the current velocity estimating unit 7B performs weighted averaging of the sea-surface velocities corresponding to the cells included in the detection area in accordance with the water depth h, the standard deviation σ of the observation errors, and the angle $\theta$ formed by the sea-surface velocity vector v and the normal vector g of the wavefront candidate of the tsunami.

With this configuration, the accuracy of estimating the tsunami current velocity can be improved.

Further, in the radar apparatus 1B according to Embodiment 3, the detection area determining unit 6B assumes wavefront candidates of the tsunami of the number of combinations of the cells corresponding to the beams at both ends of the radar coverage area.

With this configuration, the wavefront candidate can be assumed not to cause the calculation load to become excessive.

Furthermore, in the radar apparatus 1B according to Embodiment 3, the tsunami detecting unit 8A changes the detection threshold value in a manner that depends on the number of cells included in the detection area. Then, the tsunami detecting unit 8A detects the occurrence of the tsunami in the detection area, based on the result of comparison between the sea-surface current velocity in the detection area and the detection threshold value. With this configuration, tsunami detection is possible corresponding to the number of cells included in the detection area.

Furthermore, in the radar apparatus 1B according to Embodiment 3, the tsunami detecting unit 8A changes the detection threshold value in a manner that depends on the probability of occurrence of the tsunami associated with the angle $\theta$ formed by a current-velocity vector at a sea surface corresponding to each cell included in the detection area and a normal vector of a wavefront candidate of tsunami. Then, the tsunami detecting unit 8A detects the occurrence of the tsunami in the detection area, based on the result of comparison between the sea-surface current velocity in the detection area and the detection threshold value. With this configuration, a tsunami wavefront with a high probability of occurrence of the tsunami is easily detected.

Furthermore, in the radar apparatus 1B according to Embodiment 3, the tsunami detecting unit 8A performs the calculation of the wave height value of the tsunami and the prediction of arrival of the tsunami, based on the sea-surface current velocity information corresponding to the cell in the beam orthogonal to the detected wavefront of the tsunami. With this configuration, the wave height value of the tsunami can be accurately calculated, and further, the prediction of arrival of the tsunami can be accurately performed.

As illustrated in FIGS. 5, 7 and 10, the radar apparatus according to the first to Embodiment 3s each can detect the arrival of the tsunami wavefront with high accuracy using one radar apparatus.

That is, a wide range of areas can be monitored without overlapping radar coverage areas of a plurality of radar apparatus.

Note that, within the scope of the invention, free combination of each embodiment, a modification of any component of each embodiment, or omission of any component in each embodiment is possible.

INDUSTRIAL APPLICABILITY

Since radar apparatuses according to the present disclosure can detect occurrence of a detection target event with high accuracy, the radar apparatuses are suitable for ocean radar apparatuses for detecting occurrence of a tsunami, for example.

REFERENCE SIGNS LIST 1, 1A, 1B: Radar apparatus, 2: Transmission unit, 3: Reception unit, 4: Current velocity calculating unit, 4a: Current velocity database, 5: Tidal correction unit, 6, 6A, 6B: Detection area determining unit, 7, 7A, 7B: Current velocity estimating unit, 8, 8A: Tsunami detecting unit, 9: Display device, 10: Water depth database, 100: Processing circuit, 101: Transmitter, 102: Antenna, 103: Receiver, 104: Display, 105: CPU, 106: Memory.

The invention claimed is:

1. A radar apparatus comprising:
processing circuitry configured to
calculate a velocity of an observation target corresponding to each of a plurality of cells formed by dividing an observation area in a range direction and an azimuth direction, based on reception signals of electromagnetic waves radiated toward the observation area and reflected by the observation target in the observation area;
perform correction to remove a periodic bias component from the calculated velocity of the observation target at each cell;
determine a detection area at which there is a possibility that a detection target event occurs, based on one of relationships between a distance over the cells and a change in velocity of the observation target or between the distance over the cells, the change in velocity of the observation target, and a direction relation of velocity vectors of the observation target between the cells;
select and smooth velocities of the observation target corresponding to cells included in the detection area among the corrected velocities of the observation target, and estimate a velocity of the observation target at the detection area as a smoothed value; and
detect an occurrence of the detection target event in the detection area, based on the estimated velocity of the observation target.

2. The radar apparatus according to claim 1, wherein the processing circuitry is configured to estimate the velocity of the observation target at the detection area as a value obtained by integrating or averaging the velocities of the observation target in a manner that depends on an observation error of the velocity of the observation target corresponding to each cell included in the detection area.

3. The radar apparatus according to claim 2, wherein the processing circuitry is configured to perform weighted averaging of the velocities of the observation target in accordance with a standard deviation of observation errors of velocity of the observation target corresponding to each cell included in the detection area.

4. The radar apparatus according to claim 1, wherein the processing circuitry is configured to change a size of the detection area in a manner that depends on a water depth corresponding to each cell.

5. The radar apparatus according to claim 1, wherein the processing circuitry is configured to estimate a sea-surface velocity at the detection area as a value obtained by performing weighted averaging of sea-surface velocities in accordance with an observation error of the current velocity at a sea surface that is the observation target and a water depth corresponding to each cell included in the detection area.

6. A radar apparatus comprising:
processing circuitry configured to
calculate a velocity of a sea surface corresponding to each of a plurality of cells formed by dividing an observation area in a range direction and an azimuth direction, based on reception signals of electromagnetic waves radiated toward the observation area and reflected by the sea surface in the observation area;
perform correction to remove a periodic bias component from the calculated velocity of the sea surface at each cell;
determine a detection area including cells belonging to a wavefront candidate of a tsunami assumed in the observation area, based on a distance between the wavefront candidate of the tsunami and each cell;
smooth velocities of the sea surface corresponding to cells included in the detection area among the corrected velocities of the sea surface, and estimate a velocity of the sea surface in the detection area as a smoothed value; and
detect an occurrence of the tsunami in the detection area, based on the estimated velocity of the sea surface.

7. The radar apparatus according to claim 6, wherein the processing circuitry is configured to perform weighted averaging of the velocities of the sea surface corresponding to the cells included in the detection area in accordance with a water depth corresponding to each cell included in the detection area, a standard deviation of observation errors of current velocity at a sea surface corresponding to each cell included in the detection area, and an angle formed by a sea surface velocity vector corresponding to each cell included in the detection area and a normal vector of the wavefront candidate of the tsunami.

8. The radar apparatus according to claim 6, wherein the processing circuitry is configured to assume a same number of wavefront candidates of tsunami as combinations of cells about beams at both ends of a radar coverage area.

9. The radar apparatus according to claim 6, wherein the processing circuitry is configured to
change a detection threshold value in accordance with the number of cells included in the detection area, and detect an occurrence of tsunami in the detection area, based on a result of comparison between the sea-surface velocity at the detection area and the detection threshold value.

10. The radar apparatus according to claim 6, wherein the processing circuitry is configured to change a detection threshold value in accordance with a probability of occurrence of tsunami associated with an angle formed by a sea-surface velocity vector corresponding to each cell included in the detection area and a normal vector of the wavefront candidate of tsunami, and detect an occurrence of the tsunami in the detection area, based on a result of comparison between the sea-surface velocity at the detection area and the detection threshold value.

11. The radar apparatus according to claim 6, wherein the processing circuitry is configured to perform calculation of a wave height value of tsunami and prediction of arrival of tsunami, based on information about a sea-surface velocity corresponding to a cell about a beam orthogonal to a wavefront of tsunami.

\* \* \* \* \*